United States Patent
Zhou

(12)
(10) Patent No.: US 6,178,241 B1
(45) Date of Patent: Jan. 23, 2001

(54) SWITCH HOOK STATUS DETERMINATION IN A COMMUNICATION SYSTEM

(75) Inventor: Yan Zhou, Austin, TX (US)

(73) Assignee: Legerity, Inc., Austin, TX (US)

( * ) Notice: Under 35 U.S.C. 154(b), the term of this patent shall be extended for 0 days.

(21) Appl. No.: 08/870,892

(22) Filed: Jun. 6, 1997

(51) Int. Cl.$^7$ ................................................. H04M 1/00
(52) U.S. Cl. ........................... 379/382; 379/377; 379/399
(58) Field of Search ................... 379/382, 412, 379/413, 377, 373, 379, 418, 252, 24, 30, 399, 384

(56) References Cited

U.S. PATENT DOCUMENTS

| | | | |
|---|---|---|---|
| 5,323,460 | 6/1994 | Warner et al. | 379/399 |
| 5,402,482 | * 3/1995 | Minohara et al. | 379/382 |
| 5,583,934 | * 12/1996 | Zhou | 379/399 |
| 5,619,567 | * 4/1997 | Apfel | 379/413 |
| 5,636,273 | * 6/1997 | Schopfer et al. | 379/412 |
| 5,684,874 | * 11/1997 | Yangyu et al. | 379/377 |
| 5,706,342 | * 1/1998 | Baeder et al. | 379/382 |
| 5,734,712 | * 3/1998 | Randahl | 379/377 |
| 5,796,815 | * 8/1998 | Guercio et al. | 379/377 |

\* cited by examiner

*Primary Examiner*—Wing F. Chan
(74) *Attorney, Agent, or Firm*—Skjerven Morrill MacPherson LLP; Dale R. Cook; Kent B. Chambers

(57) ABSTRACT

A line card integrates subscriber line interface circuitry, A/D and D/A converters, and digital signal processing technology. The digital signal processing technology performs many line card tasks such as switch hook detection, ground key detection, DC feed control, polarity reversal, ringing tests, fault detection, power cross detection, and ring trip detection. Actual subscriber loop parametric conditions may be determined by a digital signal processor using sensed small signals on both the A and B conductors of subscriber loop. By sensing small signals, saturation of sensing circuitry may be avoided. Furthermore, relatively high speed digital signal processing facilitates accurate and expeditious switch hook status determination.

29 Claims, 10 Drawing Sheets

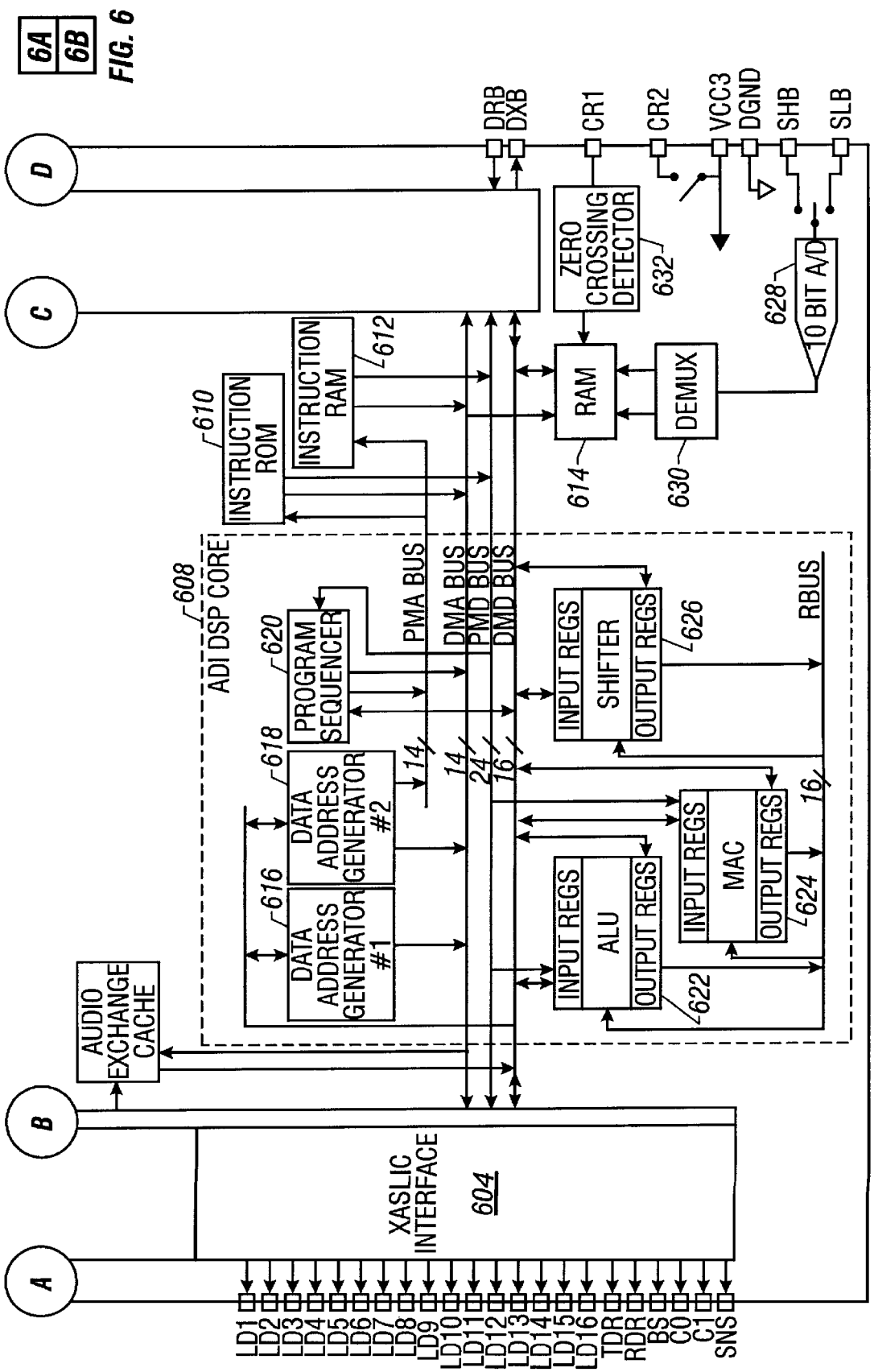

SWITCH HOOK STATUS DETERMINATION IN A COMMUNICATION SYSTEM

BACKGROUND OF THE INVENTION

1. Field of the Invention

This invention relates to a communication system and more particularly relates to determining the switch hook status of terminal equipment of the communication system.

2. Description of the Related Art

Communication systems utilizing transmission lines such as subscriber loops are commonplace throughout much of the world. Subscriber loops are terminated on one end by terminal equipment and provide a path for the terminal equipment to communicate with other terminal equipment via, for example, a vast network of central offices, private branch exchanges, satellite relay systems, transmission lines, repeaters, and wireless systems. FIG. 1 illustrates a portion of a conventional subscriber loop communication system 100. The subscriber loop 102 is modeled as a balanced two-wire transmission line 103, with loop resistances R and inductances L and leakage impedance modeled by capacitor 104 and resistor 106. The subscriber loop 102 is terminated on respective ends by terminal equipment 110 and a central office 122 line card 120. The leakage resistor 106 is generally at least tens of thousands of ohms. The subscriber loop 102 provides a communication path for information transmission such as voice signals and signaling information between a subscriber's terminal equipment and the central office 108.

Terminal equipment 110 is illustratively modeled as a telephone with off- hook resistance 112, nominally 200 ohms, and ringer impedance Z, which may be modeled, for example, as a series RC or series RLC circuit. Terminal equipment 110 includes a switch hook 118 which loads the subscriber loop 102 on the subscriber end with resistance 112 when the terminal equipment 110 is off-hook (as shown) and loads subscriber loop 102 with ringer impedance Z when the terminal equipment 110 is on-hook. Terminal equipment 110 may be any of a variety of devices besides the familiar, ubiquitous telephone such as facsimile machines, private branch exchanges, voice mail systems key telephone systems, computers, modems, telephone answering machines, alarm systems, and radio control systems, as well as many other devices.

The other end of the subscriber loop 102, opposite terminal equipment 110, converges on line card 120 of central office 122. The line card 120 terminates subscriber loop 102 at conductors A (Tip) and B (Ring) with a feed impedance of 900 ohm or other standard feed impedance. The line card 120 provides a gateway to the public switched telephone network (PSTN) through switching network 124.

Referring to FIG. 2, the subscriber line interface circuit (SLIC) 202 of line card 120 provides a two-wire interface 204 to the generally analog signal carrying subscriber loop 102. The SLIC 202 performs a variety of interface functions that allow terminal equipment 110 to communicate with other terminal equipment (not shown). The SLIC 202 and the subscriber loop audio-processing circuit (SLAC) 206 carry out the well-known BORSCHT (Battery feed, Overvoltage protection, Ringing, Supervision, Coding, Hybrid, and Test) functions. The SLIC 202 monitors direct current (DC) levels on the subscriber loop 102 with ground key detector circuitry 208 and off-hook detector circuitry 210. Input decoder and control circuitry 214 provides a mechanism for other circuitry (not shown) in the central office 122 and for SLAC 206 to control such SLIC 202 functions as subscriber loop 102 activation, ringing, and polarity reversal. Analog two-wire interface 204 and signal transmission circuitry 212 cooperate in sensing subscriber loop 102 metallic voltage (voltage at conductor A minus voltage at conductor B or Vab) while generally having a high rejection of longitudinal voltages (Vab_Long). Alternating current (AC) signals, such as voice signals, are transmitted over subscriber loop 102 to terminal equipment 110 by two-wire interface 204 and signal transmission circuitry 212 in response to voice information input signals received from central office 122 through SLAC 206. The ring relay driver 216 activates a relay(s) which connects a ringing signal from a central office 122 ringing AC voltage generator (not shown) and DC voltage bias source, to terminal equipment 110 when a third party is calling. The ring trip detector circuitry 218 detects an off-hook condition of terminal equipment 110 and initiates cessation of the ringing signal application to subscriber loop 102.

The SLAC 206 generally filters and converts analog output signals received from SLIC 202 into digital signals (A/D), processes the signals in accordance with control and timing information, and compresses the digital signals. The pulse code modulation (PCM) interface 220 provides PCM signals to the central office 122. SLAC 206 also generally receives digital audio input signals from the central office 122 via PCM interface 220, expands the digital input signals, processes the signal in accordance with control and timing information, and converts the digital signals into analog signals (D/A) for input to SLIC 202. Additional information on SLICs and SLACs is found in the 1995 Advanced Micro Devices of California data book entitled "Linecard Products for the Public Infrastructure Market."

The power feed controller 222 includes a battery feed circuit and a polarity reversal circuit. The battery feed functions supply direct current from a central office battery (not shown) to the subscriber loop 102 through balanced feed resistances at conductors A and B. Loop current is generally limited to no more than 45 to 75 milliamperes (mA) in a low-resistance subscriber loop. Higher subscriber loop resistances generally result in lower subscriber loop current. The on-hook subscriber loop powering voltage is typically the battery voltages minus 48 Volts DC (Vdc) less any overhead voltage, typically about 4 Vdc, necessary to prevent SLIC 202 saturation. Battery feed specifications are regionally provided and conform with specifications provided by, for example, BELLCORE, the Electronic Industries Association (EIA), British Telecom, and the International Telegraph and Telephone Consultative Committee (CCITT).

Call establishment performance is of considerable importance to telephone companies. Generally, terminal equipment 110 initiates a call by seizing subscriber loop 102 by loop start signaling. Another method, referred to as ground start signaling, is generally used by private branch exchanges (PBX). Loop start signaling occurs after the terminal equipment 110 goes off-hook and switch hook 118 closes the subscriber loop 102 across resistance 112 as shown in FIG. 1. The resulting DC subscriber loop current is detected by line circuit 120, which then connects equipment capable of receiving dialed address information.

Address information may be transmitted by 110 using dual tone multifrequency (DTMF) signal generators (not shown) or with dial pulses from a dial pulse instrument. The pulse rate is typically in the range of 8–12 pulses per second (pps) and may be as high as 20 pps. Pulses are generated by making and breaking (off-hook and on-hook, respectively) the subscriber loop 102 switch hook 118 connection.

Generally, the pulse duration is about 100 milliseconds (ms) with the break interval varying from about 55–65 percent of the total pulse duration. The minimum time between dial pulses is typically about 200 ms.

Regional communication authorities and central office 108 service providers generally require a line card to detect transitions between on-hook and off-hook events within a predetermined time, such as 2 ms, after the actual initiation of the transition event. However, meeting this criteria is a non-trivial task due to widely varying subscriber loop 102 characteristic such as impedance.

Subscriber loop 102 off-hook impedance varies widely from as little as about 200 ohms to over 2 kohms. When the terminal equipment 110 goes off-hook, the line impedance of subscriber loop 102 drops suddenly from at least tens of thousands of ohms suddenly to 0.2–2 kohms in a matter of milliseconds. This sudden subscriber loop 102 impedance drop causes the DC current (Idc) in subscriber loop 102 to suddenly increase. The sudden rise in Idc can saturate the circuitry switch hook detection circuitry in the off-hook detector 210. It may be difficult for the off-hook detector 210 to recover from saturation and accurately detect off-hook conditions within the required predetermined time.

Although the analog technology used to implement SLIC 202 may be optimized to operate within a small range of subscriber loop 102 characteristics, the subscriber loop 102 characteristics are dynamic, widely varying, and difficult to reliably accommodate. Also, analog circuitry often suffers from well-known aging side effects such as instability and circuit parameter drifting which may affect long-term reliability. Moreover, analog circuit features in an integrated circuit are large, presently in general on the order of about 7 $\mu$m, which increases costs of analog integrated circuitry. Furthermore, providing a cost efficient common hardware platform which lends itself to cost effective modifications to conform with various regional standards and operating environments is at least a difficult problem.

SUMMARY OF THE INVENTION

In one embodiment, a communication system line card employs the precision and stability of digital signal processing technology with the flexibility of software to provide reliable and adaptable interfacing to one or more subscriber loops. A central office generally communicates and processes digital signals. Digitally processed signals are made directly available to the central office and the line card which in at least one embodiment enhances the overall capabilities and efficiencies of the communication system by, for example, efficiently allocating processing resources and control functions. In one embodiment, the line card determines actual subscriber loop metallic current with immunity from saturation and utilizes the subscriber loop metallic current to determine switch hook status. Actual subscriber loop characteristics determined from the metallic current may be compared to a known subscriber loop characteristic impedance limit to detect an off-hook condition. In one embodiment, the line card rapidly detects changing subscriber loop impedance conditions without saturation. Saturation immunity may be achieved in one embodiment by sensing voltage drops across two small feed resistors connected in series between terminal equipment and subscriber loop A and B connectors, respectively. In one embodiment, subscriber loop conditions are sampled at a rate sufficient to minimize distortion times and allow digital signal processing circuitry to quickly and accurately detect the switch hook status.

In one embodiment of the present invention, a method of determining a status of a switch hook in a subscriber loop of a communication system includes the steps of determining actual voltage and current conditions of the subscriber loop and determining if an impedance change of the subscriber loop resulting from an on-hook to off-hook transition of the switch hook has occurred utilizing the actual voltage and current conditions and a predetermined impedance threshold.

In another embodiment of the present invention, a communication system includes circuitry for sampling actual voltage and current conditions of a subscriber loop of the communication system. The communication system further includes a line card having a processor and a memory and coupled to the sampling circuitry, the memory storing code for execution by the processor, the code including instructions for determining actual voltage and current conditions of the subscriber loop and determining if an impedance change of the subscriber loop resulting from an on-hook to off-hook transition of a switch hook in the subscriber loop has occurred utilizing the actual voltage and current conditions and a predetermined impedance threshold.

In another embodiment of the present invention, a communication system includes a subscriber loop having a tip conductor and a ring conductor and terminal equipment coupled across the tip and ring conductors, the terminal equipment including a switch hook to make and break a connection of the subscriber loop. The communication system further includes a line card coupled across the tip and ring conductors. The line card includes a memory having a resistance value stored therein, a processor coupled to the memory, current sensors disposed on the tip conductor and the ring conductor to sense respective currents in the tip and ring conductors, a voltage sensor to sense a voltage difference across the tip and ring conductors, and a processor executable module stored in the memory to determine the metallic current from the sensed currents. The line card further includes a processor executable comparison module stored in the memory to perform a comparison between the tip and ring conductors voltage difference and a product of the metallic currents and the resistance value and to make a result of the comparison available to the processor and a stabilization module for executing by the processor to allow the comparison result to stabilize within a predetermined amount of time.

BRIEF DESCRIPTION OF THE DRAWINGS

Features appearing in multiple figures with the same reference numeral are the same unless otherwise indicated.

DETAILED DESCRIPTION

The following description of the invention is intended to be illustrative only and not limiting.

Figure 1:
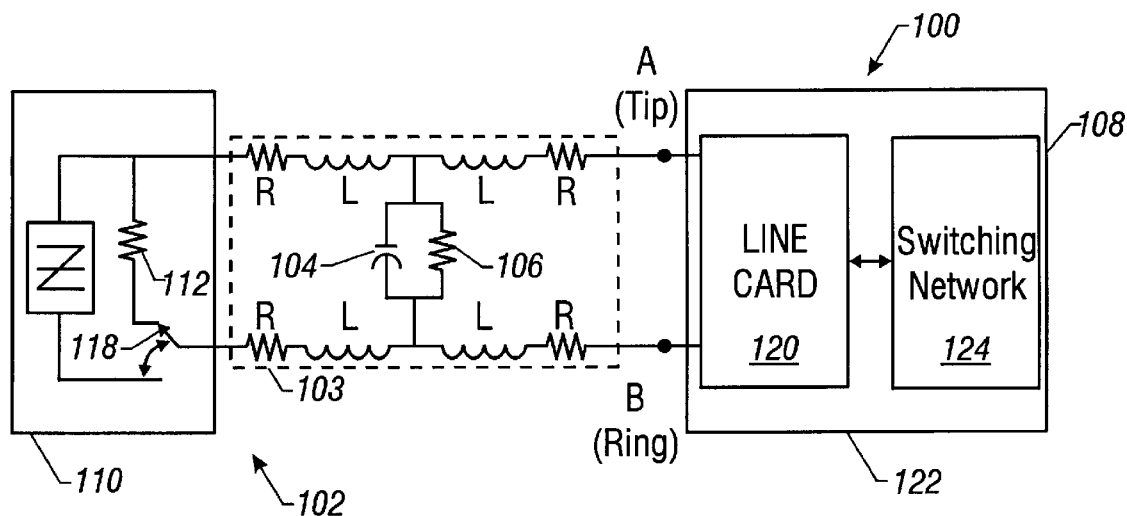
FIG. 1, labeled prior art, illustrates a subscriber loop terminated by subscriber terminal equipment and central office equipment.
Figure 2:
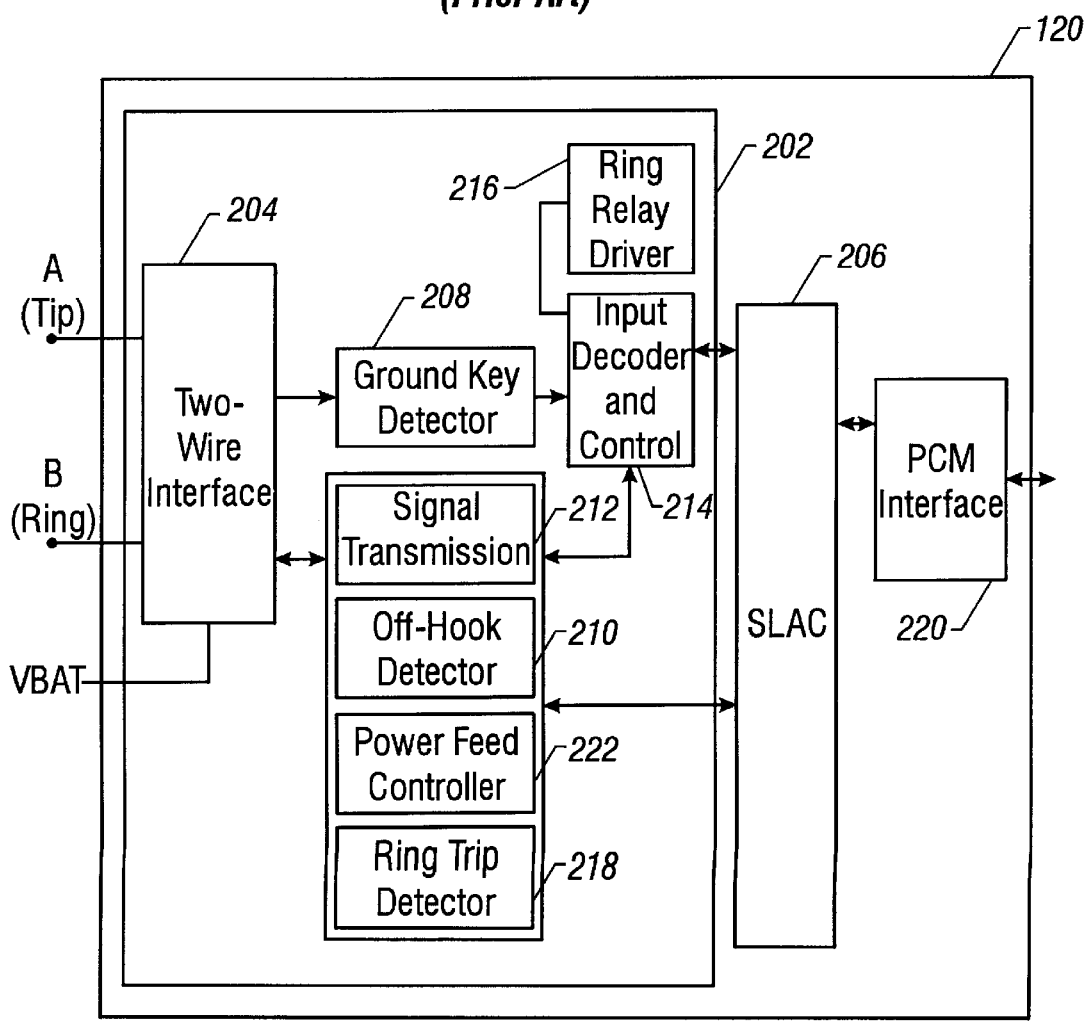
FIG. 2, labeled prior art, illustrates a line card of the central office equipment of FIG. 1.
Figure 3:
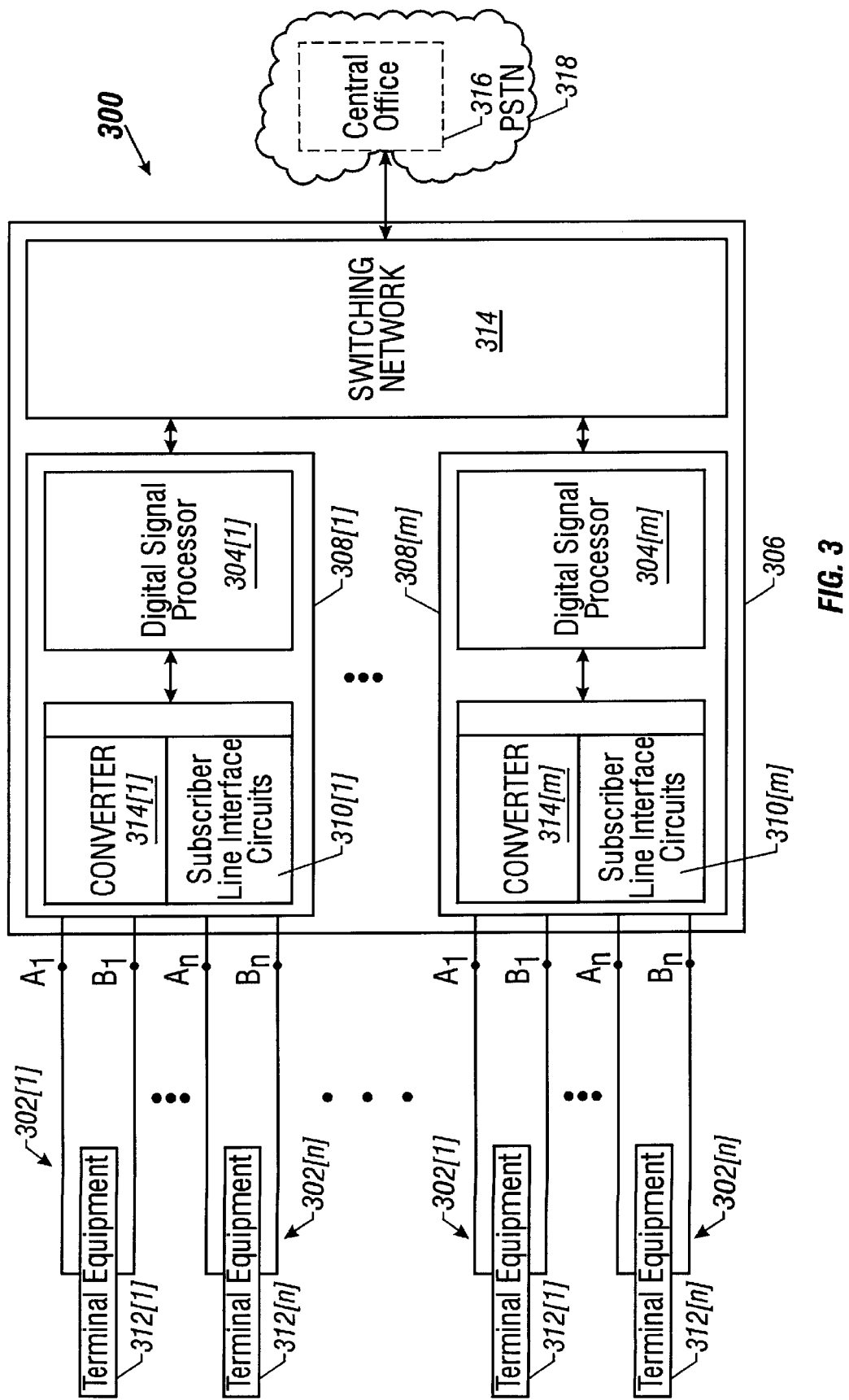
FIG. 3 illustrates a communication system having a line card employing a digital signal processor.

Referring to FIG. 3, in the communication system 300, each of the line cards 308[m] through 308[1] (308[m:1]) integrates analog data sensing and driving circuitry of SLICs 310[m:1], respectively, with programmable digital signal processors 304[m:1], respectively. Thus, the line cards 308 [m:1] deliver adaptability through programmability and long-term precision with digital signal processing circuitry stability in digital signal processors 304[m:1]. Thus, line cards 308[m:1] are well suited to assume functionality conventionally tasked to analog SLIC circuitry. Furthermore, the digital signal processing circuitry integrated circuit features are generally much smaller than analog circuit features and may be on the order of, for example, 0.25 μm which decreases the cost of line cards 308[m:1] relative to any analog signal processing features.

Figure 4:
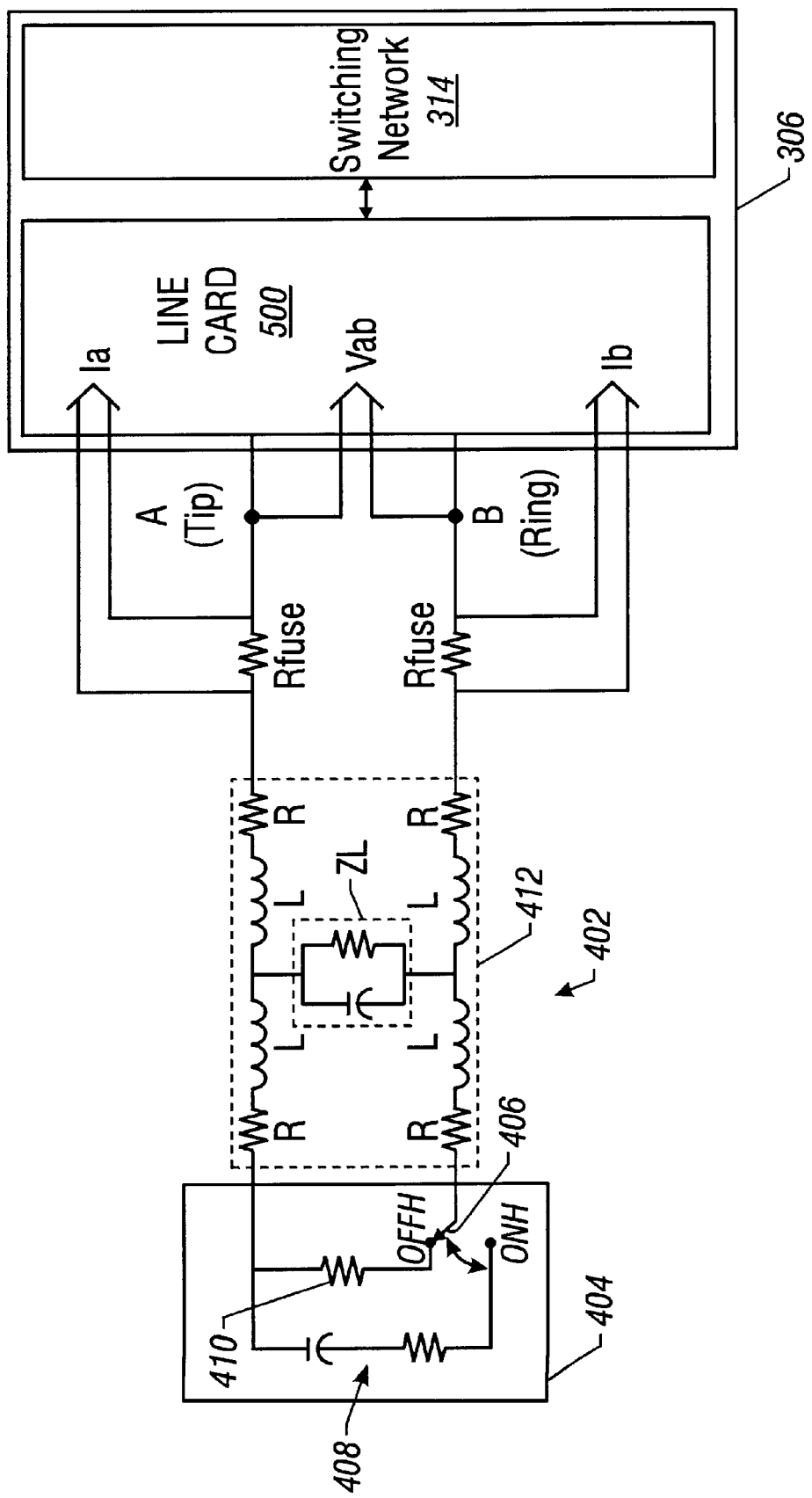
FIG. 4 illustrates an exemplary subscriber loop for monitoring conductor A and conductor B currents and monitoring metallic voltage across conductors A and B.

Referring to FIG. 4, actual subscriber loop 402 parametric conditions may be determined by sensing small signal data on both the A and B conductors of subscriber loop 402. For example, subscriber loop 402 impedance conditions may be determined to detect whether switch hook 406 is in the on-hook ONH or off-hook OFFH position. By sensing a small signal, rather than the entire subscriber loop 402 DC current, saturation of line card 308[x] circuitry is substantially avoided. Furthermore, a metallic current signal may be determined from the sensed small signals which, for a substantially balanced subscriber loop 402, provides substantial immunity to longitudinal signals on subscriber loop 402. A calculated parametric condition, such as actual subscriber loop 402 resistance, is compared to a predetermined threshold condition to determine the status of switch hook 406.

To process the sensed signal information accurately and reliably, line cards 308[m:1] employ digital signal processors 304[m:1], respectively. Each of the digital signal processors 304[m:1] processes up to 'n' subscriber loops where 'n' is an integer, for example, sixteen. The digital signal processors 304[m:1] preferably include reprogrammable memory for storing various execution modules for processing information including the sensed small signals on the A and B conductors of each of subscriber loops 302[n:1]. The predetermined comparison threshold may be altered as needed to accommodate varying characteristics of subscriber loops 302[n:1] that may arise with varying equipment usage and operating environments. With the advent of high speed digital signal processor technology, digital signal processors 304[m:1] may process information from subscriber loops 302[n:1] with a minimal amount of distortion delay and reliably meet requirements such as the 2 ms dial pulse detection requirement.

Referring to FIG. 3, "m" line cards 308[m:1] may be located in a central office 306, and each of line cards 308[m:1] may support "n" subscriber loops 302[n:1] (also referred to as "channels") where "m" and "n" are integers and "n" may vary from line card to line card. Each of subscriber loops 302[n:1] may be modeled as subscriber loop 102 or modeled in accordance with other transmission line models, and each of the terminal equipment 312[n:1] may be represented by devices such as terminal equipment 110. Each of SLICs 310[m:1] includes "n" subscriber line interface circuits respectively connected to subscriber loops 302[n:1]. SLICs 310[m:1] of line cards 308[m:1] sense data from subscriber loops 302[n:1] such as actual DC line voltage Vab_DC, and AC line signal voltage Vab(AC) across conductors A and B. Line current data, Ia and Ib at conductors A and B, respectively, are generally sensed by SLICs 310[m:1] through external balanced feed resistors (not shown). SLICs 310[m:1] also drive DC feed current, ringing signals, and signaling transmissions, and other data onto subscriber loops 302[n:1], respectively. When DC feed current is flowing into the A conductor from SLICs 310[m:1] and out of the B conductor to respective SLICs 310[m:1], Ia equals the DC feed current minus any longitudinal current, Ilong, and Ib equals the DC feed current plus Ilong. When the DC feed current is reversed during polarity reversals, Ia equals the DC feed current plus Ilong, and Ib equals the DC feed current minus Ilong. Thus, for balanced subscriber loops 302[n:1], Ia minus Ib equals the metallic current, Iab_met, in respective subscriber loops 302[n:1] regardless of the polarity of conductors A and B. Direct current feed control is illustratively described in more detail in U.S. patent application Ser. No. 08/870,895, by Yan Zhou, entitled "Direct Current Feed With Line Status Change Compensation In A Communication System," filed concurrently with this patent application and incorporated by reference in its entirety.

Converters 314[m:1] are two-way communication links between respective digital signal processors 304[m:1] and corresponding analog SLICs 310[m:1]. Each of SLICs 310 [m:1] provides analog data signals to a respective digital signal processor 304[m:1], and the digital signal processors 304[m:1] provide digital control and information data signals through D/A converters to the SLICs 310[m:1], respectively. The converters 314[m:1] sample signals, such as the parametric information sensed by SLICs 310[m:1], and perform A/D conversions which allow the analog SLICs 310[m:1] and respective digital signal processors 304[m:1] to communicate with each other. The converters 314[m:1] may also decimate signals from the respective SLICs 310 [m:1] and interpolate signals from the digital signal processors 304[m:1]. Additionally, converters 314[m:1] may frame digital signals in accordance with predetermined slot assignments allocated to each of SLICs 310[m:1] and transmit the framed information in a serial data stream to digital signal processors 304[m:1]. Conversely, converters 314[m:1] may parse a serial data stream or streams received from digital signal processors 304[m:1] to transmit respective data to SLICs 310[m:1].

Terminal equipment 312[n:1] may each transmit data signals to any other terminal equipment 312[n:1], connected to the same or different line card, or to terminal equipment (not shown) which is connected to central office 316 or to any other terminal equipment in the PSTN 318, within a private network, or within a wireless network. The data signals from each of terminal equipment 312[n:1] are digitized and routed by the switching network 314 to the intended terminal equipment recipient in accordance with transmitter and receiver identification information.

Figures 5, 5A:
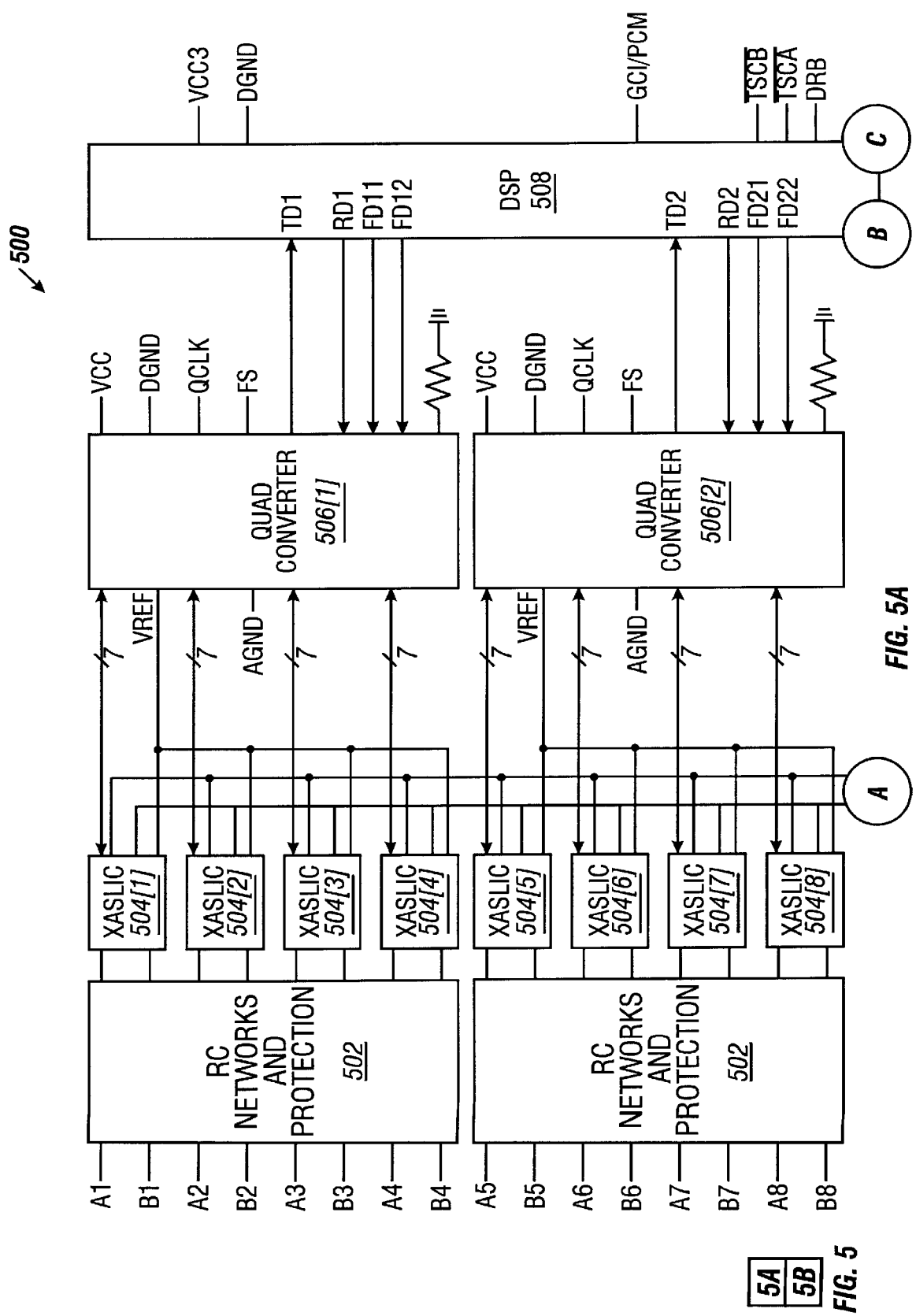
FIG. 5 illustrates an embodiment of the line card of FIG. 3.
Figure 5B:
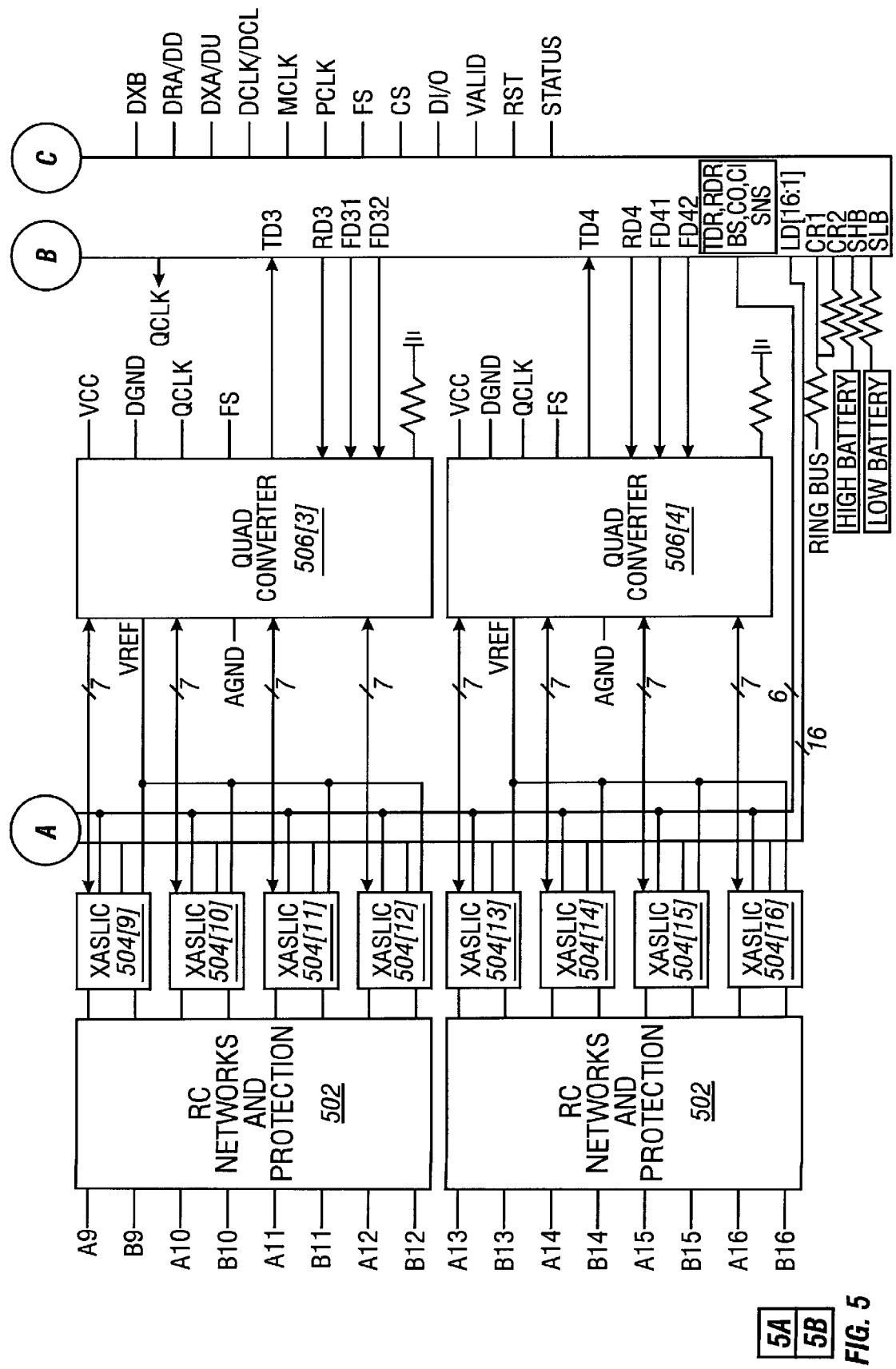

Referring to FIG. 5, one embodiment of each of the respective line cards 308[m:1] is sixteen channel line card 500 which may terminate 16 separate subscriber loops (not shown) such as subscriber loops 302[n:1] where "n" equals 16. Each of the A and B conductors, A[16:1] and B[16:1], are coupled through RC networks and protection circuitry 502.

The RC networks and protection circuitry 502 provide an interface between terminal equipment 312[16:1] and subscriber line interface circuits (XASLICs) 504[16:1], respectively. The RC networks and protection circuitry 502 prefilter input signals received from connected terminal equipment and provide, for example, over current protection for the line card 500. Respective current sense resistors in series between the A and B conductors of each subscriber loop and terminal equipment allow Ia and Ib current samples to be taken by an XASLIC.

The XASLICs 504[16:1] represent an embodiment of SLICs 310[m:1] (FIG. 3), respectively. Subscriber loop 302[x] data, such as AC signal voltage Vab_AC, DC bias voltage Vab DC, and currents at the subscriber loop A and B conductors, Ia and Ib, respectively, is sensed by each of the XASLICs 504[16:1]. XASLICs 504[16:13], XASLICs, [12:9], XASLICs[8:5], and XASLICs[4:1] transmit analog output signals representative of the sensed subscriber loop parametric information to quad converters 506[4:1], respectively. Additionally, XASLICs 504[16:1] receive analog data signals, such as voice signals, a dial tone signal, ringing signals, a DC feed control signal, and a reference voltage, from a connected one of quad converters 506[4:1]. These data signals are superimposed upon a DC bias voltage determined by the DC feed control signal and transmitted over a subscriber loop to terminal equipment. The respective DC feed control signals dictate the polarity of DC bias voltage and the magnitude of DC feed current supplied to the subscriber loops 302[16:1] by each of the XASLICs 504[16:1], respectively. The DC feed control signals ensure that power supplied to respective subscriber loops 302[16:1] remains within the power envelope dictated by regional specifications.

In one embodiment, each of the converters 314[m:1] (FIG. 3) is divided into four quad converters 506[4:1]. Each of the quad converters 506[4:1] provides an A/D and D/A conversion interface between four of the XASLICs 504[16:1] and the digital signal processor 508. AC input signals from XASLICs 504[16:1] such as voice signals are sampled with 6 bit resolution at a frequency of 4 MHz and decimated to reduce the sampling frequency to 32 kHz. Three data signals representing Vab, Ia, and Ib from each of the sixteen supported subscriber loops are all sampled by respective A/D converters with 10 bit resolution at a sampling frequency of 4 kHz. Additionally, Ia is used as an input to thermal shutdown circuitry to detect and respond to potentially dangerous current levels on a subscriber loop. Each of the quad converters 506[4:1] place all of the converted input signals from all sixteen XASLICs 504[16:1] into respective predetermined slots in a 4 MHz digital serial data stream. The 4 MHz serial data streams from each of the quad converters 506[4:1] are received and processed by the digital signal processor 508.

The quad converters 506[4:1] also each receive three 4 MHz serial digital data streams from the digital signal processor 508 which include information for the subscriber loops 302[16:1] supported by the quad converters 506[4:1] and for range control for the respective Vab, Ia, and Ib data input signals to the A/D converters. The range control allows resolution of particular data to be increased or decreased. The digital signal processor 508 output serial data streams include predetermined slots with signal data, such as voice signal data, DC feed control data, and longitudinal voltage compensation data for each of subscriber loops 302[16:1]. These serial data streams are converted into parallel data, parsed for transmission to each of the XASLICs [16:1] from predetermined slots, and routed to respective linear interpolators (not shown). The respective DC feed signal data for each of subscriber loops 302[n:1] is also parsed and routed to respective DC feed linear interpolators (not shown) to increase the sampling frequency from 250 Hz to 256 kHz. The digital output signals from each DC feed linear interpolator are converted into an analog DC feed control signal for respective XASLICs 504[16:1]. XASLICs 504[16:1] provide DC current feed to subscriber loops 302[16:1] respectively, in response to DC current feed levels indicated by the respective DC feed control signal from digital signal processor 508. Four bit resolution longitudinal voltage compensation data signals from digital signal processor 508 for each of subscriber loops 302[16:1], respectively, is also parsed and routed to a D/A converter. The corresponding output analog signals are transmitted to the respective XASLICs 504[16:1] connected to subscriber loops 302 [16:1], respectively.

Figure 6A:
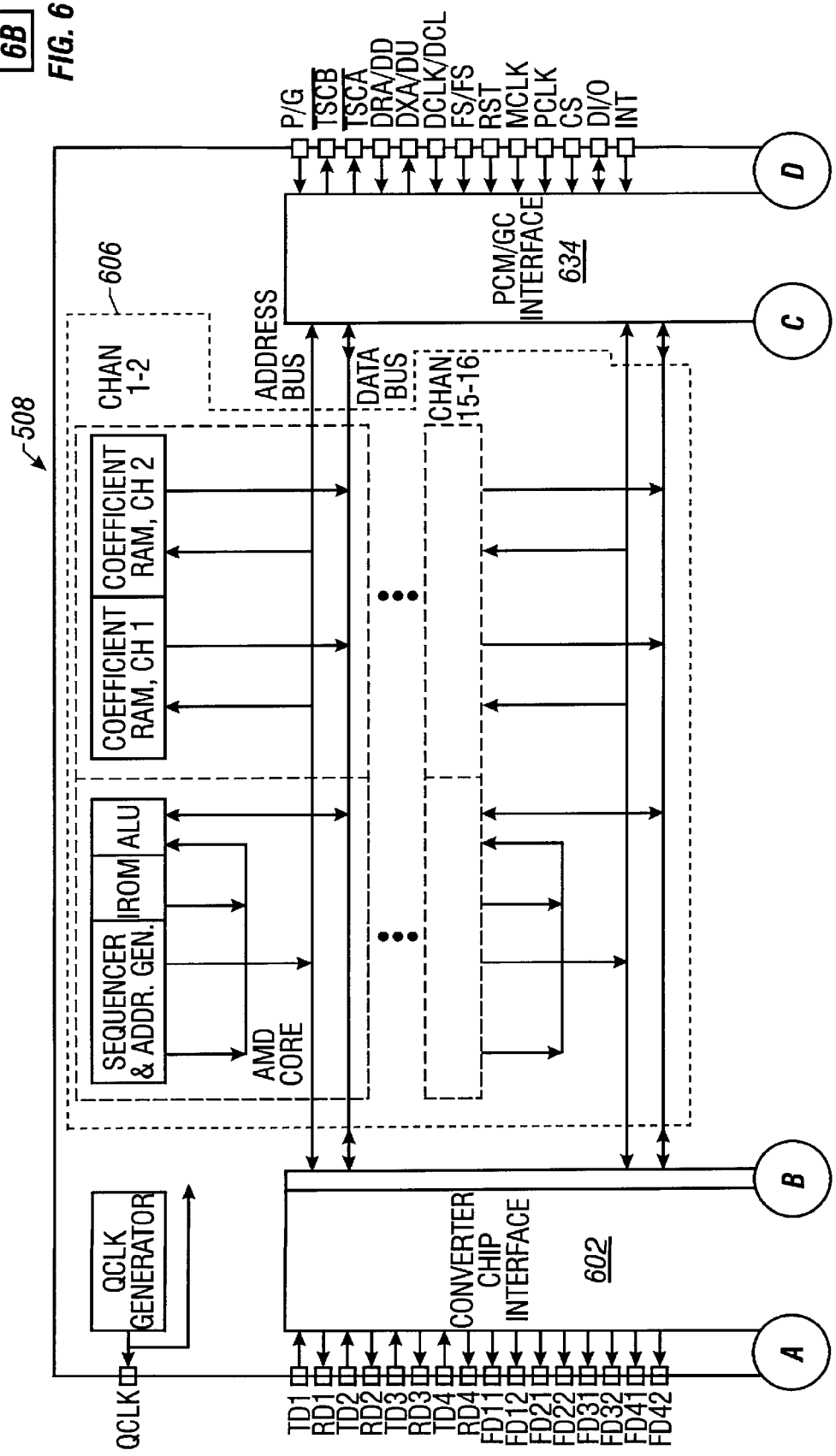
FIG. 6 illustrates an embodiment of the digital signal processor of FIG. 3.

Referring to FIG. 6, the digital signal processor 508 interconnects to the quad converters 506[4:1] through output terminals TD[4:1], RD[4:1], FD11, FD12, FD21, FD22, FD31, FD32, FD41, and FD42 of converter chip interface 602. Converter chip interface 602 processes the serial data streams from each of quad converters 506[4:1] to retrieve information from each predetermined slot in the serial data streams. Thus, information from each of XASLICs 504 [16:1] is available for individual processing by audio processor core 606 and digital signal processor core 608. Converter chip interface 602 also assigns information for respective XASLICs 504[16:1] and quad converters 506 [4:1] from audio processor core 606 and digital signal processor core 608 to respective predetermined time slots in the 4 MHz digital output serial data streams. Each of quad converters 506[4:1] receives three 4 MHz digital data streams from digital signal processor 508, one for audio signals and two for DC feed control and the A/D range control. Digital signal processor 508 also programs a register (not shown) of each of XASLICs 504[16:1] with output signals LD[16:1], respectively, TDR, RDR, BS, C0, C1, and SNS transmitted through the XASLIC interface 604. The register (not shown) controls XASLIC modes such as standby, active, and ringing modes. XASLIC interface 604 inserts register information in predetermined slots for each of respective XASLICs 504[16:1]. Audio processor core 606 provides digital audio signal processing.

The digital signal processor core 608 processes instructions stored in instruction ROM (read only memory) 610 and instruction RAM (random access memory) 612. Data addresses are generated by data address generator #1 616 and data address generator #2 618. The program sequencer 620 provides program execution timing. To perform various arithmetic operations, digital signal processor core 608 also includes an arithmetic logic unit 622, a multiply, accumulate, and carry unit 624, and a shifter 626, each with respective input and output registers.

To utilize accurate, real time central office 306 battery voltage levels in various calculations, central office 306 high and low battery voltages are sampled from input terminals SHB and SLB, respectively. The voltages at input terminals SHB and SLB are sampled by 10 bit A/D converter 628, demultiplexed by demux 630, and stored in RAM 614 as Vbat. Ringing voltage signals from the central office 306 ring generator (not shown) are received at input terminals CR1 and CR2. Zero crossing detector 632 provides data to RAM 614 representing zero crossings of external ringing signals generated by central office 306. Digital signal processor operates on 5 V supplied by the central office 306 at input terminal VCC3. The digital signal processor core 608 and audio processor core 606 transmit to and receive communication signals from the central office 306 (FIG. 3). These communication signals are converted to and from PCM signal format by the PCM/microprocessor interface 634. The PCM/microprocessor interface 634 supports standard direct digital information transfer of, for example, digital filter coefficients, between the line card 508 and central office 306.

Figure 7:
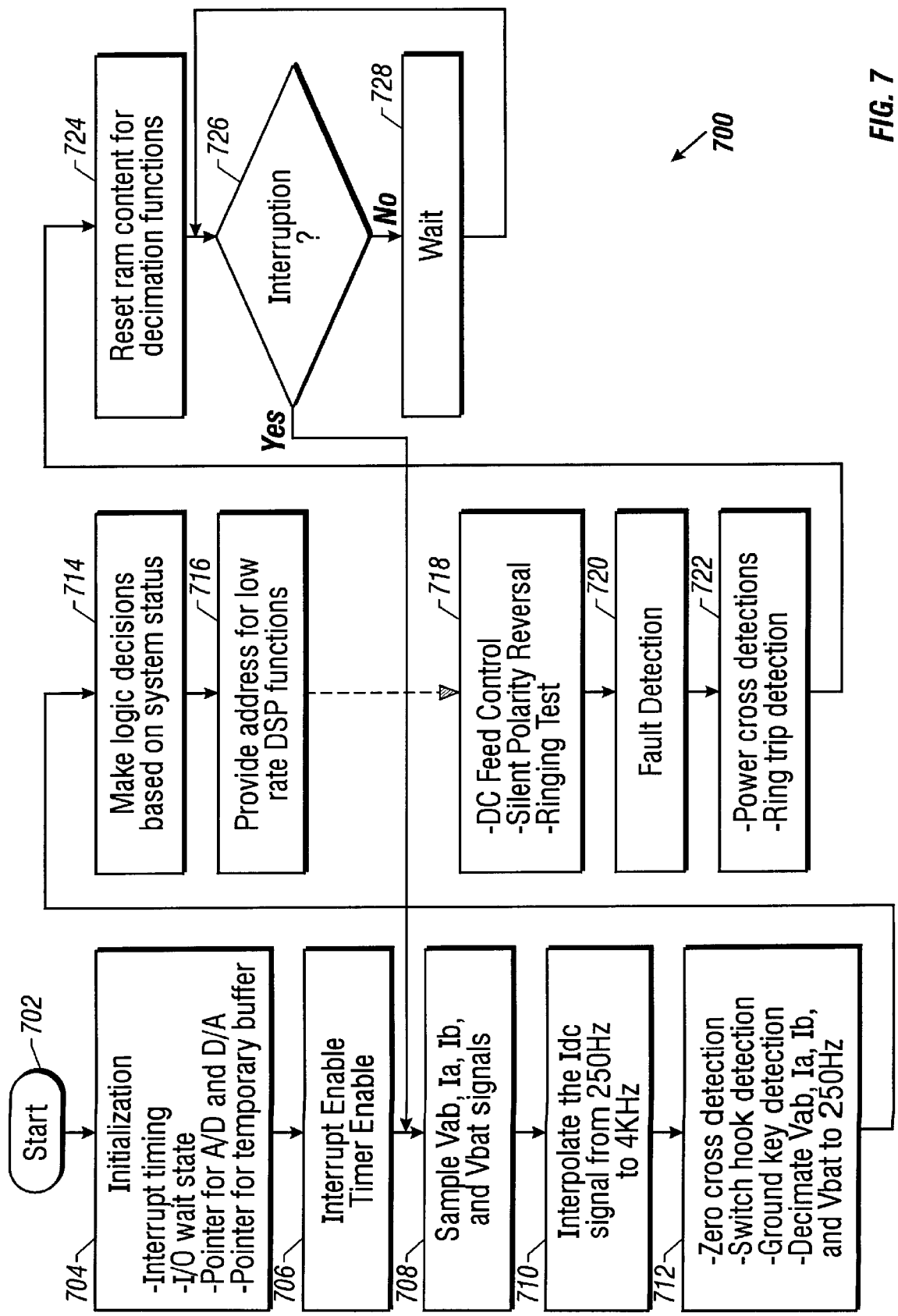
FIG. 7 illustrates an execution timing flow diagram of the digital signal processor of FIG. 6.

Referring to FIG. 7, the digital signal processor 508 executes an endless loop of operation modules. The computer program execution timing of the digital signal processor core 608 proceeds as illustrated in the signal processing flow 700. When the digital signal processor core 608 is started at operation 702, an initialization module 704 sets up interrupt timing so that signal processing flow 700 executes at a predetermined rate. I/O wait states, pointers for the A/D and D/A module 708, and a pointer for a temporary buffer are also set up in operation 702. After initialization, interrupts and a timer are enabled as shown in operation 706. Next, the A/D and D/A module 708 is executed and parametric voltage data, Vab, and current data Ia and Ib, sampled by each of the XASLICs 504[16:1] (FIG. 5) from each of the respective subscriber loops 302[16:1], and Vbat are retrieved for use by the digital signal processor core 608 in subsequent processing. In operation 710, an interpolator is set up to interpolate 250 Hz data from the digital signal processor 508 to 4 kHz data.

The digital signal processor core 608 then proceeds in subscriber loop status and decimation operation 712 to successively execute zero cross detection, switch hook detection, and ground key detection modules. The zero cross detection module detects the voltage and current zero crossing of an integral ringing signal central office 306 or internally supplied by digital signal processor 508. Ring relays of the line cards 308[m:1] disconnect ringing signals on a subscriber loop 302[x] from a ring generator (not shown) of the central office 306 after a ring trip is detected by power cross and ring trip detection module 722. The ring generator (not shown) is preferably not disconnected after a ring trip detection until a current zero crossing is detected to avoid damaging the ring relays. Ring trip detection is further illustratively described in U.S. patent application Ser. No. 08/870,893, by Yan Zhou, entitled "Ring Trip Detection In A Communication System", filed concurrently with this patent application and incorporated by reference in its entirety. The switch hook detection module detects loop start signaling on- and off-hook transitions and detects make and break signals (dial pulses).

Figure 8:
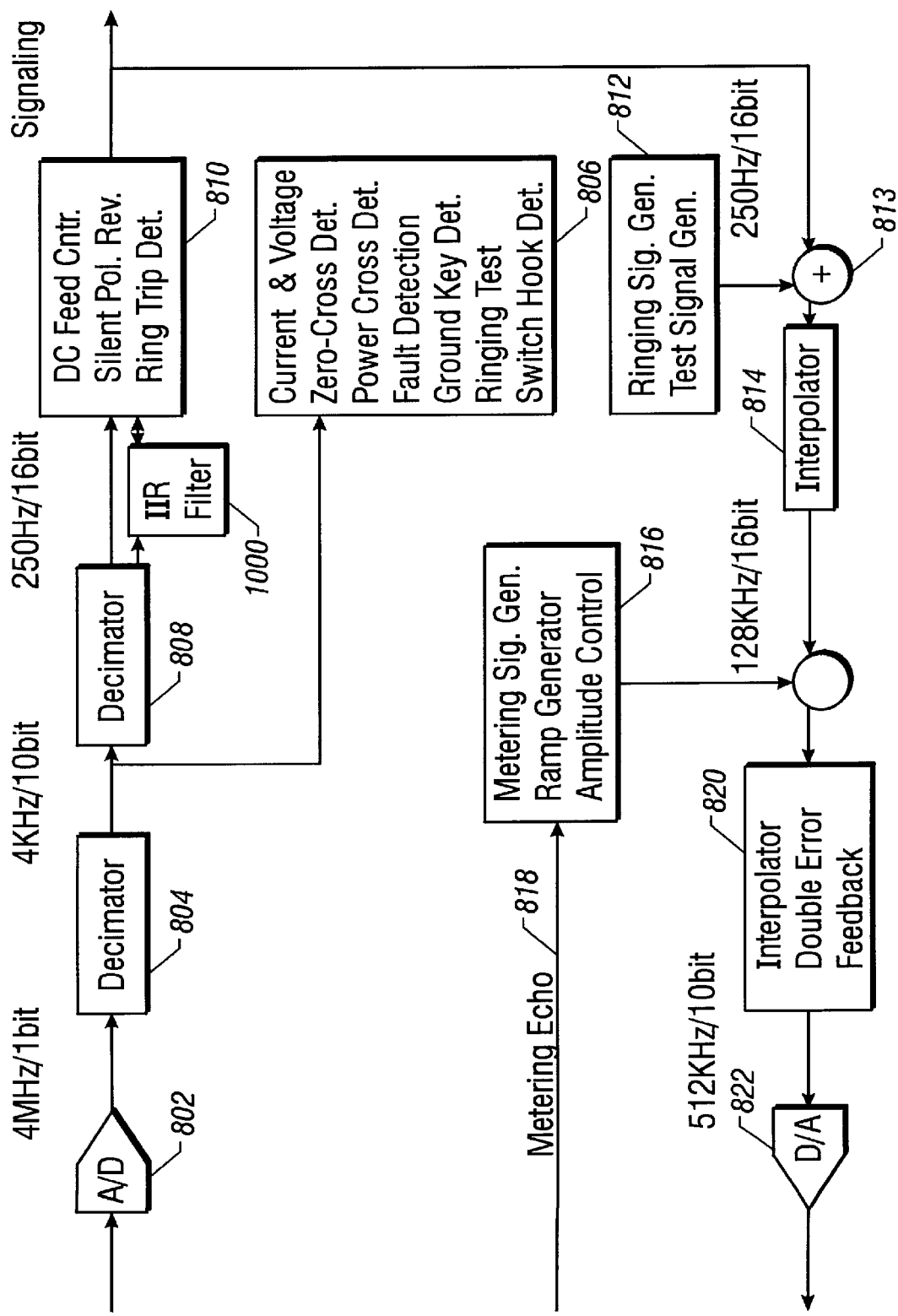
FIG. 8 illustrates input and output data sampling frequencies utilized by the line card of FIG. 5 for each supported subscriber loop.

Referring to FIG. 7 and 8, in one embodiment of the signal processing flow 700, the digital signal processing modules in operation 806 have access to 4 kHz sampled information and are executed at 4 kHz, and the DC feed control, silent polarity reversal, and ring trip detection functions in the DC feed control module 718 and power cross and ring trip detection module 722 may be performed at a 250 Hz and have access to both 250 Hz and 4 kHz sampled data.

Referring to FIG. 8, input and output data sampling frequencies utilized by digital signal processor core 608 for each of supported subscriber loops 302[16:1] are illustrated. As described above, each of the quad converters 506[4:1] performs an A/D conversion 802 on signals received from connected XASLICs 504[16:1] and provides a 4 MHz serial data stream to digital signal processor 508. Decimator 804 of converter chip interface 602 decimates the 4 MHz serial data stream to a sampling frequency of 4 kHz and provides a 10 bit parallel output signal to digital signal processor core 608 which contains the sampled parametric data for each of the supported subscribpT loops 302[16:1]. Current and voltage zero cross detection, switch hook detection, and ground key detection modules of operation 712 (FIG. 7), the power cross detection module of operation 722 (FIG. 7), and fault detection module of operation 720 (FIG. 7), corporately shown in operation 806, operate at a 4 kHz rate and utilize the 4 kHz sampled parametric data. The 4 kHz data stream is further decimated to a sampling frequency of 250 Hz by decimator 808 of the converter chip interface 602. The DC feed control and silent polarity reversal modules of operation 718 (FIG. 7) and ring trip detection module of operation 722 (FIG. 7), corporately shown in operation 810, operate at 250 Hz and utilize the 4 kHz and 250 Hz sampled data.

Quad converters 506[x] interpolate DC feed control signals, silent polarity reversal signals, and any ringing and test signals from central office 306 ring and test signal generators 812 from adder 813 to a 128 kHz sampling frequency, 16 bit data stream with interpolator 814. Output signals from metering signal, ramp generator, and amplitude control operation 816 are added by adder 815 to the output data signals of 814. Operational block 816 is illustratively described by Zhou, et al., "Metering Signal Level Control Circuit," U.S. Pat. No. 5,452,345. These composite output signals are for a single subscriber loop 302[x] with each of subscriber loops 302[16:1] being processed serially. For each subscriber loop 302[x], the digital composite output signal from adder 815 is interpolated to a 512 kHz sampling frequency, 10 bit output signal by the single error feedback interpolator 820 in a quad converter 506[x] and converted into an analog signal with the D/A converter 822 of quad converter 506[x] for input to the XASLIC 504[x] connected to the subscriber loop 302[x] just processed.

Figure 9:
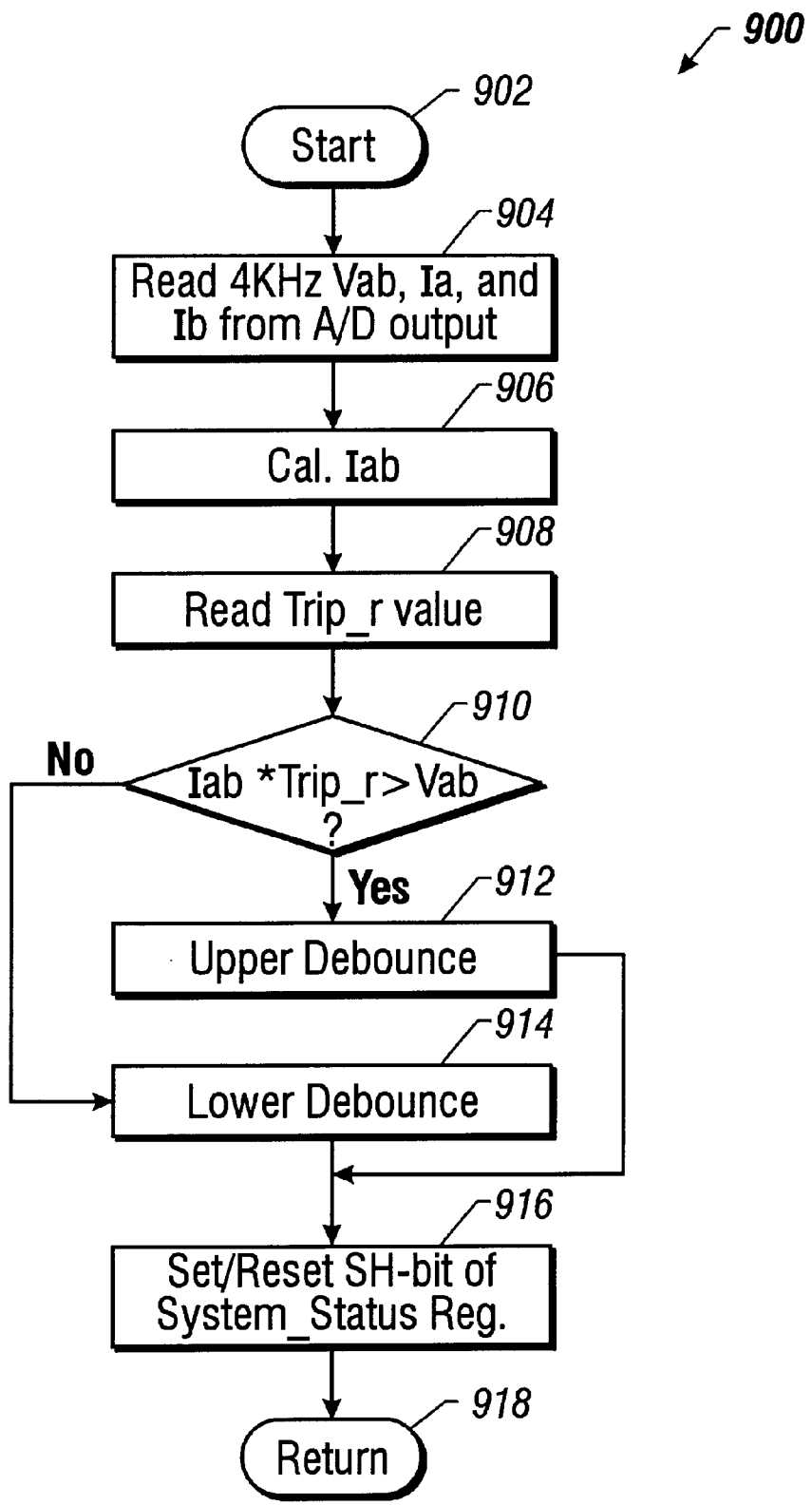
FIG. 9 illustrates an embodiment of the switch hook detection module of the digital signal processor execution timing flow diagram of FIG. 7.

Referring to FIG. 9, switch hook detection module 900 of operation 712 (FIG. 7) determines the switch hook status for each of subscriber loops 302[n:1]. Each pass through switch hook detection module 900 utilizes parametric data obtained from one subscriber loop 302[x], where subscriber loop 302[x] represents each of the subscriber loops 302[n:1].

Referring to FIG. 4, virtually identical resistors, respectively identified as Rfuse, are placed in series with the A and B conductors of subscriber loop 402. Subscriber loop 402 represents an embodiment of subscriber loop 302[x]. Each resistor Rfuse is preferably chosen to be sufficiently small so that the voltage drop across resistors Rfuse attributed to a maximum DC metallic current on subscriber loop 402 will not saturate circuitry on line card 500 such as voltage monitoring and detection circuitry (not shown). For example, each resistor Rfuse may be 50 ohms so that DC currents as large as 75 mA generate only a 3.5 V voltage drop across each resistor Rfuse.

When the terminal equipment 404, which is an embodiment of terminal equipment 312[x], is on-hook, switch hook 406 opens the subscriber loop 402 to DC signals by connecting the B conductor to terminal equipment 404 terminal ONH. In this condition and in the absence of a fault, DC feed current supplied by line card 500 is nominal and flowing only through leakage impedance ZL of transmission line 412. A resistive component of ZL is generally at least tens of thousands of ohms. When the terminal equipment 404 transitions from on-hook to off-hook, switch hook 406 closes the subscriber loop 402 across resistor 410 by contacting terminal OFFH. In this off-hook condition, DC feed current supplied by line card 500 begins to flow through subscriber loop 402 and across resistor 410 and resistors Rfuse.

The resistors Rfuse each provide a small signal proportional to currents Ia and Ib, respectively, which is sensed by, for example, an XASLIC 504[x] of line card 500, where XASLIC 504[x] represents any of XASLICs 504[16:1] connected to subscriber loop 302[x]. In one embodiment, XASLIC 504[x] detects the actual subscriber loop 402 currents Ia and Ib. The sign convention for currents Ia and Ib is positive when flowing out of line card 500 conductor A. The XASLIC 504[x] also detects the metallic voltage Vab across conductors A and B. XASLIC 504[x] feeds the detected subscriber Loop 302[x] currents Ia and Ib and the voltage Vab to the quad converter 506[y] connected to XASLIC 504[x]. Quad converter 506[y], representing any of quad converters 506[4:1], samples Ia, Ib, and Vab data. Decimator 804 reduces the sampling rate to 4 kHz. The 4 kHz samples of Ia, Ib, and Vab data are stored in line card 500 memory and made available to the modules of operation 806 (FIG. 8).

Referring to FIG. 9, after entering subscriber line status and decimation operation 712 (FIG. 7), digital signal processor core 608 executes the switch hook detection module 900 beginning at start operation 902. Proceeding to operation 904, digital signal processor core 608 reads the 4 kHz sampled Vab, Ia, and Ib data. Next, in operation 906 digital signal processor core 608 calculates the subscriber loop 402 metallic current, Iab, by subtracting Ib from Ia, which as discussed above substantially eliminates the effect of sampled longitudinal currents. Thus, Iab equals Ia+I_longitudinal minus (−Ib +I_longitudinal) or, equivalently, equals Ia+Ib. Ia+Ib is approximately equal to 2 times Ia for a normally balanced subscriber loop 402. In operation 908, a predetermined threshold value, 'Trip_j', is read from memory.

In decision operation 910, digital signal processor core 608 compares determined subscriber loop 402 parametric data with a predetermined threshold condition to determine the status of switch hook 406. During an on-hook to off-hook transition, current in subscriber loop 402 increases as the impedance of subscriber loop 402 decreases. Digital signal processor core 608 determines whether Iab times Trip_y is greater than Vab, where the sampled Iab and Vab closely reflect, as described below, the actual, real time parametrics of subscriber loop 402. The digital signal processor core 608 may calculate the at least approximate real time subscriber loop 402 impedance (Vab/Iab/2) and compare this approximate real time impedance to a predetermined Trip_r threshold impedance, Trip_r*2 (equivalently Vab/Iab compared to Trip_r) to determine the status of switch hook 406. The at least approximate real time current in subscriber loop 402, Iab, may also be compared to Trip_r/Vab to determine the status of switch hook 406. The value of Trip_r is selected to be greater than ½ of a known maximum DC closed loop resistance of subscriber loop 402 and less than a minimum 'no fault' leakage resistance. For example, line card 500 may be required to support a maximum 2 kohm DC closed loop resistance plus a maximum known terminal equipment 404 off-hook resistance 412 of 400 ohms. Trip_r is preferably programmable to accommodate actual subscriber loop 402 characteristics. Thus, switch hook detection module 900 provides flexibility to accurately and quickly detect off-hook conditions of subscriber loops with a variety of resistance characteristics.

The time between actual subscriber loop 402 on-hook and off-hook transition and detection is generally less than 0.25 ms. Sampling the actual subscriber loop 402 voltage, Vab, across conductors A and B at the 4 kHz rate ensures that the sampled Vab is always within approximately 0.25 ms of representing the actual subscriber loop 402 voltage Vab. Likewise, the 4 kHz sample of the actual subscriber loop 402 currents Ia and Ib across respective resistors Rfuse is also always within approximately 0.25 ms of representing the actual subscriber loop 402 currents Ia and Ib. Thus, assuming for illustrative purposes that the maximum subscriber DC closed loop impedance is 2 kohms, if Trip_r is chosen as 2 kohms, Iab times Trip_r exceeds Vab within 0.25 ms of an actual on-hook to off-hook transition event of terminal equipment 404. Likewise, Iab times Trip_r is less than or equal to Vab within 0.25 ms of an actual off-hook to on-hook transition event of terminal equipment 404. With no more than 0.25 ms of distortion between actual and sampled subscriber loop 402 parameters, switch hook detection module 900 detects transitions between on-hook and off-hook well within the 2 ms requirement. It will be apparent that increasing or decreasing the sampling and processing rates of Vab, Ia, and Ib allows switch hook detection module 900 to detect faster or slower, respectively.

When an on-hook to off-hook transition occurs, switch hook detection module 900 proceeds to the upper debounce operation 912 which keeps track of the number of consecutive off-hook switch hook 406 status determinations by operation 910. If an on-hook switch 406 determination is made by operation 910, the upper debounce operation 912 resets. The upper debounce operation 912 eliminates spurious current changes having a duration of less than a predetermined amount of time that would alter the outcome of operation 910. The upper debounce operation 912 confirms an off-hook switch hook 406 condition from operation 910 for a programmable number of predetermined consecutive passes through switch hook detection module 900. At an operating frequency of 4 kHz, each consecutive pass equates to 0.25 ms. The off-hook (break) interval of a 20 pps (50 ms/pulse) dial pulse generally has a minimum duration of 27.5 ms. Thus, the number of consecutive passes is programmably selected to encompass a time less than 27.5 ms and preferably more time than typical spurious changes. For example, 40 consecutive passes may be selected so as to eliminate any spurious current changes having a duration of 10 ms or less.

When an off-hook to on-hook transition occurs, switch hook detection module 900 proceeds to the lower debounce operation 914 which keeps track of the number of consecutive on-hook switch hook 406 status determinations by operation 910. If an off-hook switch 406 determination is made by operation 910, the lower debounce operation 914 resets. The lower debounce operation 914 also eliminates spurious current changes having a duration of less than a predetermined amount of time that would alter the outcome of operation 910. The lower debounce operation 914 confirms an on-hook switch hook 406 condition from operation 910 for a programmable number of predetermined consecutive passes through switch hook detection module 900. The on-hook (make) interval of a 20 pps (50 ms/pulse) dial pulse generally has a minimum duration of 22.5 ms. Thus, the number of consecutive passes is programmably selected to encompass a time less than 22.5 ms and again preferably more time than typical spurious changes. For example, 40 consecutive passes may be selected so as to eliminate any spurious current changes having a duration of 10 ms or less.

The upper debounce operation 912 sets a switch hook status bit in the System_Status register (not shown) of digital signal processor core 608 if the number (e.g. 40) of programmed consecutive switch hook 406 off-hook status determinations are made. Otherwise, upper debounce operation 912 resets the switch hook status bit. The lower debounce operation 912 resets the switch hook status bit in the System-Status register (not shown) if the number (e.g. 40) of programmed consecutive switch hook 406 on-hook status determinations are made. Otherwise, lower debounce operation 912 resets the switch hook status bit. The switch hook detection module 900 then returns to subscriber loop status and decimation operation 712 (FIG. 7).

Referring to FIG. 7, the ground key detection module executed by the digital signal processor core 608 in subscriber loop status and decimation operation 712 detects ground start signaling. After executing the zero cross detection, switch hook detection, and ground key detection modules, the 4 kHz sampled Vab, Ia, and Ib for each subscriber loop, and Vbat data is decimated to a 250 Hz sampling frequency.

In status operation 714, digital signal processor core 608 interprets the zero crossing detection, switch hook detection, and ground key detection status information obtained in subscriber loop status and decimation operation 712 and takes appropriate action such as identifying and forwarding to the central office 306 a number dialed by terminal equipment based upon the number of make and break connections determined by the switch hook detection module, supplying a dial tone to terminal equipment that has seized a subscriber loop, and disconnecting a ringing signal at a zero crossing after a ring trip.

The digital signal processing DC feed control, silent polarity reversal, and ring trip detection functions in the DC feed control module 718 and power cross and ring trip detection module 722 are low rate functions performed at 250 Hz, one-sixteenth the rate of the subscriber loop status and decimation operation 712 functions. Accordingly, during a single pass through signal processing flow 700, these 250 Hz low rate functions are only executed for a single subscriber loop 302[x] and are executed for each of subscriber loops 302[16:1] only once every 16 passes. The channel identification module 716 identifies which of subscriber loops 302[16:1] is to be processed during the next execution of operations 718, 720, and 722. After identification, the feed control module 718 provides DC feed control, silent polarity reversal, and a ringing test for the identified subscriber loop 302[x]. The silent polarity reversal module of the feed control module 718 is illustratively described in U.S. patent application Ser. No. 08/870,894, filed concurrently with the patent application and entitled "Silent Polarity Reversal In A Communication System" by Yan Zhou, which is incorporated herein by reference in its entirety.

Referring to FIG. 7, after exiting the feed control module 718, fault detection module 720 determines whether a fault exists in subscriber loop 302[x].

Signal processing flow 700 then proceeds to power cross and ring trip detection module 722 to detect power zero crossing and a ring trip. The ring trip detection is further illustratively described in Yan Zhou, "Ring Trip Detection In A Communication System". After executing power cross and ring trip detection module 722, RAM contents are reset in operation 724 in anticipation of subsequent decimation functions. Operation 726 detects an interruption from a system timer (not shown) which occurs at the operating frequency of signal processing flow 700, which in one embodiment is 4 kHz. If the interruption is not received, signal processing flow 700 enters a wait state in operation 728 until the interruption is received. During the wait state, digital signal processing core 608 may perform other functions such as processing audio signals.

While the invention has been described with respect to the embodiments and variations set forth above, these embodiments and variations are illustrative and the invention is not to be considered limited in scope to these embodiments and variations. For example, various sampling rates are indicated which may be changed in accordance with factors such as the processing speed of the digital signal processor core 608. Also, circuitry may be used to establish a wireless link between each line card 308[m:1] and a central office to provide, for example, remote data and control access. Furthermore, redundant line cards and/or redundant subscriber loop interface circuits may be implemented and switched in when necessary to replace corresponding defective circuitry. Accordingly, various other embodiments and modifications and improvements not described herein may be within the spirit and scope of the present invention, as defined by the following claims.

What is claimed is:

1. A method of determining a status of a switch hook in a subscriber loop of a communication system comprising:
   determining actual voltage in a subscriber loop and current conditions of the subscriber loop;
   determining an impedance value of the subscriber loop utilizing the actual voltage and current conditions, and
   assessing the status of the switch hook in response to the determined impedance value.

2. The method as in claim 1 wherein the assessing further comprises:
   determining a threshold subscriber loop voltage condition from the determined current conditions and a predetermined impedance threshold; and
   comparing the threshold subscriber loop voltage with the actual subscriber loop voltage, wherein the subscriber loop impedance change resulting from the on-hook to off-hook transition of the switch hook is determined to have occurred when the threshold subscriber loop voltage exceeds the actual subscriber loop voltage.

3. The method as in claim 1 wherein the assessing further comprises:
   comparing the impedance value of the subscriber loop with a predetermined impedance threshold; and
   assessing the status of the switch hook as off-hook when the actual subscriber loop impedance value is less than the predetermined impedance threshold.

4. The method as in claim 1 wherein the determining actual voltage and current conditions of the subscriber loop further comprises:
   sampling the voltage condition of the subscriber loop at a sampling rate sufficient to obtain a subscriber loop voltage sample within a predetermined switch hook on-hook to off-hook transition time; and
   sampling the current condition of the subscriber loop at a sampling rate sufficient to obtain a subscriber loop current sample within the predetermined switch hook on-hook to off-hook transition time.

5. The method of claim 4 wherein the sampling rates are sufficient to obtain the subscriber loop voltage and current samples within the predetermined switch hook on-hook to off-hook transition time and within a predetermined time sufficient to stabilize the switch hook on-hook to off-hook transition.

6. The method of claim 5 wherein the sampling rate is 4 kHz, and the predetermined switch hook on-hook to off-hook transition time is two milliseconds.

7. The method as in claim 1 further comprising:
   stabilizing the assessing the status of the switch hook in response to the determined impedance value.

8. The method of claim 7 wherein the stabilizing the assessing the status of the switch hook in response to the determined impedance value further comprises:
   delaying a definitive outcome of the assessing the status of the switch hook in response to the determined impedance value for a predetermined time.

9. The method of claim 7 wherein the stabilizing the assessing the status of the switch hook in response to the determined impedance value further comprises:
   repeating the assessing the status of the switch hook in response to the determined impedance value for a predetermined amount of time until a consistent outcome of the assessing the status of the switch hook in response to the determined impedance value is obtained.

10. The method of claim 9 wherein the predetermined amount of time is less than a minimum dial pulse duration of terminal equipment coupled to the subscriber loop.

11. The method of claim 1 comprising:
   executing the steps of claim 1 respectively for a plurality of signals from respective subscriber loops with circuitry disposed on a line card of a communication system.

12. The method of claim 1 comprising:
   executing the steps of claim 1 with a processor from code stored in a memory coupled to the processor.

13. The method of claim 12 wherein a predetermined impedance threshold is programmable.

14. The method of claim 1 wherein the determining actual voltage and current conditions of the subscriber loop further comprises:
   sampling a voltage difference signal across tip and ring conductors of the subscriber loop;
   sampling subscriber loop ring conductor current across a resistor having a predetermined value;
   sampling subscriber loop tip conductor current across a resistor having approximately the predetermined value; and
   determining a subscriber loop metallic current from the respective sampled subscriber loop tip and ring conductor currents.

15. A communication system comprising:
   circuitry for sampling actual voltage and current conditions of a subscriber loop of the communication system; and
   a line card having a processor and a memory and coupled to the sampling circuitry, the memory storing code for execution by the processor, the code including instructions for
      determining actual voltage in a subscriber loop and current conditions of the subscriber loop,
      determining an impedance value of the subscriber loop utilizing the actual voltage and current conditions, and
      assessing a status of a switch hook in response to the determined impedance value.

16. The communication system of claim 15 wherein the memory storing code for execution by the processor further comprises code including instructions for determining if an outcome from execution of the assessing instructions remains consistent for a predetermined amount of time and for storing a stabilized outcome from the execution of the assessing instructions.

17. The communication system of claim 16 wherein the predetermined amount of time is less than a minimum dial pulse duration of the switch hook.

18. The communication system of claim 15 wherein a predetermined impedance threshold is stored in a read/write memory.

19. The communication system of claim 15 further comprising:
   respective circuitry for sampling actual voltage and current conditions of a plurality of subscriber loops of the communication system;
   wherein the memory further storing code for execution by the processor for respectively determining actual voltage and current conditions of each of the plurality of subscriber loops and determining if an impedance change of each of the plurality of subscriber loops resulting from respective on-hook to off-hook transitions of respective switch hooks in each of the plurality of subscriber loops has occurred utilizing the actual voltage and current conditions and a predetermined impedance threshold for each of the plurality of subscriber loops.

20. The communication system of claim 15 wherein the sampling circuitry comprises:
   a subscriber line interface circuit having sensing circuitry coupled across respective subscriber loop ring and tip current impedances to detect subscriber loop ring and tip currents, respectively, and having sensing circuitry coupled across subscriber loop tip and ring conductors to detect subscriber loop tip and ring voltages; and
   analog to digital conversion circuitry coupled between the subscriber line interface.

21. The communication system of claim 20 wherein the respective subscriber loop ring and tip current impedances each have a value wherein predetermined maximum voltages across the impedances will not saturate the sensing circuitry coupled across respective subscriber loop ring and tip current impedances.

22. The communication system of claim 1 further comprising:
   terminal equipment coupled to the subscriber loop and having a switch hook.

23. A communication system comprising:
   a subscriber loop having a tip conductor and a ring conductor;
   terminal equipment coupled across the tip and ring conductors, the terminal equipment including a switch hook to make and break a connection of the subscriber loop;
   a line card coupled across the tip and ring conductors, the line card including:
      a memory having a resistance value stored therein;
      a processor coupled to the memory;
      current sensors disposed on the tip conductor and the ring conductor to sense respective currents in the tip and ring conductors;
      a voltage sensor to sense a voltage difference across the tip and ring conductors;
      a processor executable module stored in the memory to determine the metallic current from the sensed currents;
      a processor executable comparison module stored in the memory to perform a comparison between the tip and ring conductors voltage difference and a product of the metallic currents and the resistance value and to make a result of the comparison available to the processor; and
      a stabilization module for executing by the processor to allow the comparison result to stabilize within a predetermined amount of time.

24. The communication system of claim 23 wherein the current sensors comprise:
   a first resistor connected in series with the tip conductor;
   first circuitry, coupled across the first resistor, having an output signal coupled to the processor which is proportional to any current flowing in the tip conductor;
   a second resistor connected in series with the ring conductor; and
   second circuitry, coupled across the second resistor, having an output signal coupled to the processor which is proportional to any current flowing in the ring conductor.

25. The communication system of claim 24 wherein respective maximum voltage signals across the first and second resistors do not saturate the first and second circuitry, respectively.

26. The communication system of claim 24 wherein the first and second resistors are balanced.

27. The communication system of claim 23 wherein the resistance value stored in the memory approximates a maximum subscriber loop impedance when the switch hook makes a connection between the terminal equipment and subscriber loop.

28. The communication system of claim 23 wherein the terminal equipment is a member of the group consisting of a telephone, facsimile machine, private branch exchange, key telephone system, voice mail system, modem, computer, alarm system, radio control system, and telephone answering machine.

29. A communication system comprising:
   means for conducting electronic signals;
   means for determining a metallic current in the means for conducting;
   means for determining a voltage across respective conductors of the means for conducting;
   a read/write means for storing;
   means for reading a programmable predetermined threshold value from the means for storing;
   means for determining the actual impedance status of the means for conducting;
   means, coupled to the means for storing, for comparing the actual impedance status of the means for conducting with the predetermined threshold value;
   means for stabilizing a comparison result from the means for comparing; and
   means for making the comparison result available to the circuitry of the communication system.

* * * * *

UNITED STATES PATENT AND TRADEMARK OFFICE
CERTIFICATE OF CORRECTION

PATENT NO.    : 6,178,241 B1            Page 1 of 1
DATED         : January 23, 2001
INVENTOR(S)   : Yan Zhou It is certified that error appears in the above-identified patent and that said Letters Patent is hereby corrected as shown below:

<u>Column 16,</u>
Line 12, please delete "if".
Line 13, please delete "change" and insert -- value --.
Lines 14-16, please delete "resulting from respective switch hooks in each of the plurality of subscriber loops has occurred".
Line 20, after "loops" and before "." please insert -- , and assessing a status of respective switch hooks in each of the plurality of the subscriber loops --.
Line 36, please delete "1" and insert -- 15 --.

Signed and Sealed this

Twenty-ninth Day of January, 2002

Attest:

Attesting Officer

JAMES E. ROGAN
*Director of the United States Patent and Trademark Office*